United States Patent
Adamic et al.

(10) Patent No.: US 10,400,122 B2
(45) Date of Patent: *Sep. 3, 2019

(54) NON-NEWTONIAN INKJET INKS (71) Applicant: Hewlett-Packard Development Company, L.P., Fort Collins, CO (US)

(72) Inventors: Raymond Adamic, Corvallis, OR (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 272 days.

This patent is subject to a terminal disclaimer.

(21) Appl. No.: 15/119,087

(22) PCT Filed: Mar. 6, 2014

(86) PCT No.: PCT/US2014/021196
§ 371 (c)(1),
(2) Date: Aug. 15, 2016

(87) PCT Pub. No.: WO2015/134026
PCT Pub. Date: Sep. 11, 2015

(65) Prior Publication Data
US 2016/0355696 A1    Dec. 8, 2016

(51) Int. Cl.
*C09D 11/38*    (2014.01)
*B41J 2/01*    (2006.01)
(Continued)

(52) U.S. Cl.
CPC ............... *C09D 11/38* (2013.01); *B41J 2/01* (2013.01); *B41M 5/0023* (2013.01); *C09D 11/322* (2013.01); *C09D 11/36* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,591,612 A   5/1986  Quinn
4,728,578 A   3/1988  Higgins et al.
(Continued)

FOREIGN PATENT DOCUMENTS

CN    1810897    8/2006
CN    102558950    7/2012
(Continued)

OTHER PUBLICATIONS

International Search Report dated Dec. 3, 2014 for PCT/US2014/021196, Applicant Hewlett-Packard Development Company, L.P.

*Primary Examiner* — Manish S Shah
(74) *Attorney, Agent, or Firm* — Thorpe North & Western LLP (57) ABSTRACT

The present disclosure provides non-Newtonian inkjet inks and related methods. In one example, a non-Newtonian inkjet ink include a dispersion of metal oxide particles in an amount ranging from 0.1% to 10% by weight based on the total weight of the non-Newtonian inkjet ink; a salt in an amount of 0.05% to 10% by weight based on the total weight of the non-Newtonian inkjet ink; and an organic solvent. Additionally, the metal oxide form a structured network in a presence of the salt and the inkjet ink have a dynamic viscosity ranging from 25 cps to 10,000 cps at shear rate of 5 $s^{-1}$ and a dynamic viscosity ranging from 1 cps to 50 cps at a shear rate of 10,000 $s^{-1}$.

20 Claims, 3 Drawing Sheets

(51) Int. Cl.
  *B41M 5/00* (2006.01)
  *C09D 11/322* (2014.01)
  *C09D 11/36* (2014.01)

(58) Field of Classification Search
  CPC ...... B41J 2/1755; B41J 2/2114; B41J 2/2117;
    B41J 2/2056; B41J 2/21; B41J 2/0057;
    B41J 3/60; B41J 2002/012; B41J
    2/04598; B41J 2/04588; B41J 2/04595;
    B41J 2/04586; B41J 2/14274; B41J
    11/0015; B41J 11/002; C09D 11/36;
    C09D 11/40; C09D 11/30; C09D 11/38;
    C09D 11/32; C09D 11/322; C09D
    11/324; C09D 11/328; C09D 11/101;
    C09D 11/102; C09D 11/005; C09D
    11/54; C09D 11/52; B41M 5/0011; B41M
    5/0017; B41M 5/0047; B41M 7/00;
    B41M 7/0072; B41M 5/52; B41M 5/5218
  See application file for complete search history.

(56) References Cited

U.S. PATENT DOCUMENTS

| | | | |
|---|---|---|---|
| 5,973,036 A | 10/1999 | Matzinger et al. | |
| 6,499,839 B1 | 12/2002 | Busby et al. | |
| 6,663,704 B2 | 12/2003 | Spencer et al. | |
| 6,986,809 B2 | 1/2006 | Spencer et al. | |
| 7,320,727 B2 | 1/2008 | Jou et al. | |
| 7,563,314 B2 | 7/2009 | Breton et al. | |
| 8,435,339 B2 | 5/2013 | Koyano et al. | |
| 9,631,104 B2* | 4/2017 | Adamic | B41J 2/01 |
| 9,723,246 B2* | 8/2017 | Thomas | H04N 5/64 |
| 9,822,270 B2* | 11/2017 | Adamic | B41J 2/21 |
| 9,963,607 B2* | 5/2018 | Adamic | B41J 2/04 |
| 2002/0033116 A1 | 3/2002 | Spencer et al. | |
| 2003/0144375 A1* | 7/2003 | Wu | C09D 11/30 |
| | | | 523/160 |
| 2005/0165135 A1 | 7/2005 | Mozel et al. | |
| 2007/0283846 A1 | 12/2007 | Breton et al. | |
| 2008/0045618 A1 | 2/2008 | Nagvekar | |
| 2009/0163615 A1* | 6/2009 | Halahmi | C09D 11/36 |
| | | | 347/102 |
| 2011/0169887 A1 | 7/2011 | Kabalnov et al. | |
| 2012/0028002 A1 | 2/2012 | Yokoi et al. | |
| 2012/0032108 A1 | 2/2012 | Stockum et al. | |
| 2013/0160672 A1 | 6/2013 | Kasperchik | |

FOREIGN PATENT DOCUMENTS

| | | |
|---|---|---|
| CN | 103124775 | 5/2013 |
| CN | 103347964 | 10/2013 |
| JP | 01188574 | 7/1989 |
| JP | 2012017400 | 1/2012 |

* cited by examiner

NON-NEWTONIAN INKJET INKS

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants, typically in a predominantly aqueous fluid. When a recording is made on "plain paper," the deposited colorants retain some mobility, which can be manifest in poor bleed, edge acuity, feathering, and inferior optical density/chroma (due to penetration on the paper). These features adversely impact text and image quality. Some systems include using a coated paper or coating the paper immediately before printing with the inkjet ink. Such coatings generally contain various components such as fixers to reduce colorant mobility. However, such systems can be costly, can lower print quality, and/or can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Reference will now be made to the exemplary embodiments illustrated, and specific language will be used herein to describe the same. It will nevertheless be understood that no limitation of the scope of the disclosure is thereby intended.

DETAILED DESCRIPTION

In accordance with the present technology, non-Newtonian inkjet inks can be prepared where the viscosity of the inks can be manipulated by physical forces allowing for printing of the inks via inkjet technologies while achieving superior viscosity upon printing. Notably, the reformation of a structured network after printing can allow for the present non-Newtonian inkjet inks to provide better optical density than achieved by traditional Newtonian inkjet inks.

Thus, examples described herein are directed to non-Newtonian inkjet inks that are useful in standard inkjet printing systems. The present non-Newtonian inkjet inks can be inkjet printed as the viscosity of the non-Newtonian inkjet inks can be lowered using shear or thermal forces within an inkjet printhead. Once exiting the printhead, the viscosity of the present non-Newtonian inkjet inks rapidly increases (e.g. within 30 seconds) via self-assembly of a structured network within the non-Newtonian inkjet inks. Generally, the structured network within the non-Newtonian inkjet inks can be assembled through interaction between the metal oxides and facilitated by salts.

It is noted that when discussing the present compositions and methods, each of these discussions can be considered applicable to each of these embodiments, whether or not they are explicitly discussed in the context of that embodiment. Thus, for example, in discussing a metal oxide used in a non-Newtonian inkjet ink, such a metal oxide can also be used in a method of manufacturing a non-Newtonian inkjet ink and/or a method of printing a non-Newtonian inkjet ink, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, utilizing the present non-Newtonian inkjet inks can eliminate the need for some layers, can eliminate costly additives, and/or can eliminate the amounts of materials needed in the media sheets/inks.

With the above in mind, a non-Newtonian inkjet ink can comprise a metal oxide in an amount ranging from 0.1% to 10% by weight based on the total weight of the non-Newtonian inkjet ink, a salt in an amount of 0.05% to 10% by weight based on the total weight of the non-Newtonian inkjet ink, and an organic solvent. Additionally, the metal oxide in the presence of dissolved salt can form a structured network where the inkjet ink has a dynamic viscosity ranging from 25 cps to 10,000 cps at a shear rate of 5 $s^{-1}$ (or 1/s) and a dynamic viscosity ranging from 1 cps to 50 cps at a shear rate of 10,000 $s^{-1}$. At an even higher shear rate range (>50,000-100,000 $s^{-1}$) dynamic viscosity of the inks can drop further, e.g. from 1 to 10 cps. As such, high shear rates or other mechanical or thermal forces can enable reliable jetting from inkjet printheads. Such viscosities can be measured using an Anton Paar Rheometer or a CAP2000 rheometer from Brookfield Instruments, and can be measured by shearing at room temperature (25° C.). Notably, the addition of heat with shear can alter, e.g. lower, the viscosity profiles of the present inks. It is noted that in one specific example, the inkjet ink can be an aqueous inkjet ink, comprising a water content from 30% to 95% by weight.

As used herein, "structured network" refers to the three dimensional structure formed by the metal oxide particles in the presence of salt via electrostatic interactions and/or physical interactions in the non-Newtonian inkjet ink, wherein the three dimensional structure is dependent upon mechanical and/or thermal forces. Such mechanical and/or thermal forces, such as shear energy or heat energy, weaken the structured network resulting in the viscosity changes based on the amount of force applied, as discussed herein. In one example, the structured network can be free of polymers in that the three dimensional structure does not comprise polymers. However, such an example does not preclude polymers to be present within the non-Newtonian inkjet ink, or even trapped or contained within the structured network. For example, the present non-Newtonian inkjet inks can further comprise a polymeric surfactant that does not self-assemble as part of the three dimensional structure but can be present within such a structure.

Regarding the present description as it relates to "non-Newtonian," a non-Newtonian fluid is one which has viscosity dependent on an applied force such as shear or thermal forces (added thermal). For example, shear thinning fluids decrease in viscosity with increasing rate of shear. The inks of the present application can show these same shear thinning effects, under the fluid ejection conditions in which ink is moved between the fluid container and the printhead of an inkjet device. In another example, thermal thinning fluids decrease in viscosity with increasing rate of heat. The inks of the present application can likewise show these same thermal thinning effects, when the inks are heated during printing, e.g., at the fluid container or at the printhead of an inkjet device.

In another aspect that is not intuitive to many observers, the colorants, e.g. dispersed pigments that may be even large and dense pigments, in such non-Newtonian liquids show little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (~at least 10,000 Pascals) is applied to the ink to move it through the inkjet system or when the ink is heated to 50° C. or more, the ink viscosity can change significantly, e.g. from 25 to 2 cps. Thus, when such inks are ejected at a high frequency from inkjet dispensing devices, the dynamic viscosities of the inks measured inside of the printhead do not interfere with the ejection process of the inkjet system. Generally, during the time when the ink is not moving or being heated, pigment or other particulate settling is either completely prevented or slowed down by several orders of magnitude.

Figure 1:
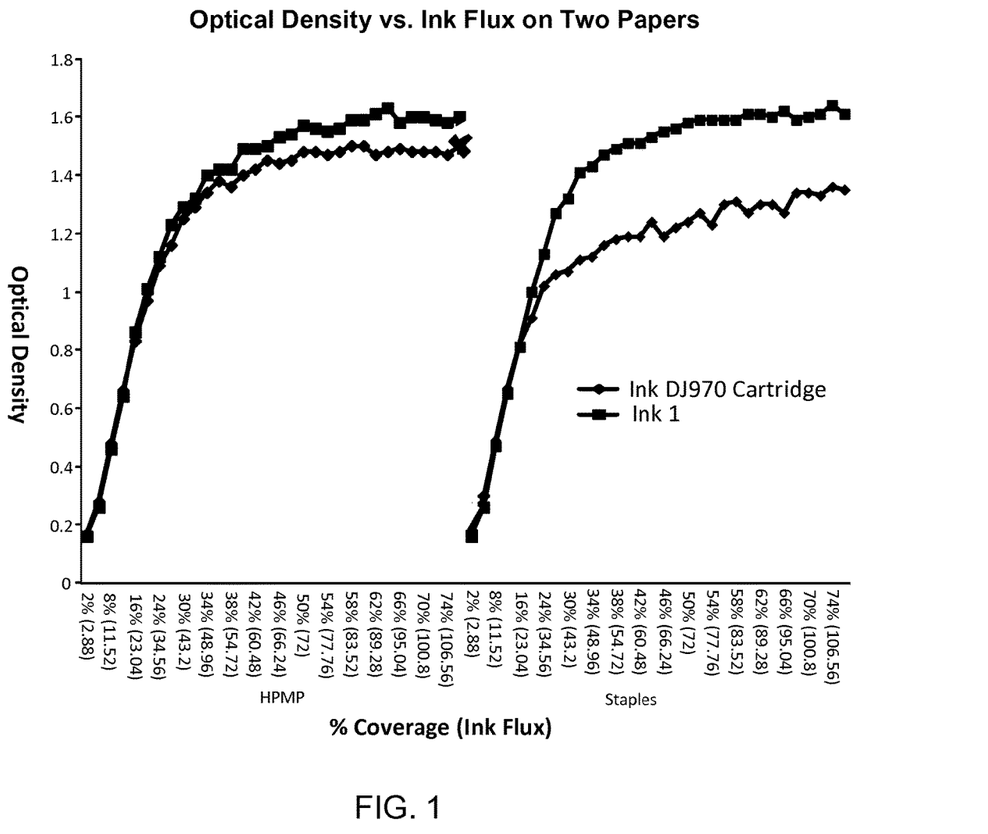
FIG. 1 is a graph of optical density vs. ink flux for a non-Newtonian inkjet and a comparative ink in accordance with an example of the present disclosure.

The present non-Newtonian inkjet inks can also provide excellent ink efficiency independent on the media used. For example, FIG. 1 provides a graph of ink efficiency measured as optical density vs. ink flux for a non-Newtonian ink of the present disclosure and a comparative ink commercially available inkjet ink. As shown in FIG. 1, the present inks have improved optical densities across the paper set as compared to a current commercial ink. In one example, the optical density of the non-Newtonian inkjet ink can be increased by at least 5% over a comparative inkjet ink printed from the same inkjet printer on the same recording media with the same print coverage. In other aspects, the optical density can be increased by 10%, 15%, 20%, 30%, or even 50%. Such recording media can include both coated and uncoated recording media. As used herein, "comparative inkjet ink" refers to a Newtonian inkjet ink such as the one in commercially available in HP®970 Black ink cartridge.

Generally, the structured network comprises a metal oxide. As used herein, "metal oxide" refers to a molecule comprising at least one metal (e.g., Al) or semi-metal (e.g., Si) atom and at least one oxygen atom which in a particulate form is able to form a three dimensional structure in the presence of salt dissolved in an organic solvent and/or water, thereby forming a structured network. As used herein "semi-metal" includes boron, silicon, germanium, arsenic, antimony, and tellurium, for example. In one example, the metal oxide can include with limitation aluminum oxide, silicon dioxide, zinc oxide, iron oxide, titanium dioxide, indium oxide, zirconium oxide, or mixtures thereof. As discussed herein, the metal oxide (again which is defined to include both metal and semi-metal oxides) can generally be present in the non-Newtonian inkjet ink in an amount ranging from 0.1% to 10% by weight based on the total weight of the non-Newtonian inkjet ink. In one example, the metal oxide can be present in an amount at from 1% to 5% by weight, and in one aspect, at from 0.5% to 2% by weight, based on the total weight of the non-Newtonian inkjet ink. Additionally, the particle size of the metal oxide can be varied depending on the desired properties of the non-Newtonian inkjet ink. For example, the bigger the particle size, the less viscous the non-Newtonian inkjet ink tends to be. In one example, the particle size can be from 5 nm to 50 nm. In another aspect, the particle size can be from 10 nm to 25 nm.

Generally, the structured network forms in a presence of a salt dissolved in liquid phase. In one example, the salt can be an inorganic salt. In another aspect, the salt can be a monovalent salt. Such monovalent salts can include sodium, lithium, potassium cations, as well as nitrate, chloride, acetate anions, or mixtures thereof. In another aspect, the salt can be multivalent, i.e. containing multivalent cations or anions or both, such as calcium nitrate, magnesium nitrate, magnesium sulfate and/or mixtures thereof. In one example, the salt can be an organic salt containing organic anion. In another aspect, the salt can be an organic salt comprising an organic cation or combination of organic anion and cation.

As discussed herein, the salt can generally be present in the non-Newtonian inkjet ink in an amount ranging from 0.05% to 10% by weight based on the total weight of the non-Newtonian inkjet ink. In one example, the salt can be present in an amount of 0.5% to 4% by weight, and in one aspect, 1% to 2% by weight based on the total weight of the non-Newtonian inkjet ink.

The inclusion of a salt, particularly a dissolved salt in gelator ink can contribute to the structure of the ink. In the case of metal oxide gelators, a salt can act to shield the electrostatic repulsion between particles and permit the van der Waals interactions to increase, thereby forming a stronger attractive potential and resulting in a structured network by providing elastic content to a predominantly fluidic system. As mentioned, these structured systems show non-Newtonian flow behavior, thus providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of salt can impact both the jettability and the response after jetting. When comparing two gelator inkjet inks (with or without salt, but otherwise identical), the ink with salt will typically have a lower viscosity over a range of shear rates. In one example, the salt can be added such that its presence in this system is just enough to make an appreciable difference in the printing characteristics of the ink, but not so much that the ink becomes too low in viscosity. This amount can be determined by routine experimentation. For example, the salted gelator ink can be designed so that the ink can refill quickly and produce a higher quality print. Higher quality printing can be determined in one aspect by improved optical density (when a colorant is present in the ink). Typically, inks with salt can have higher optical densities, while retaining good jettability properties and other properties, such as ink structure, rheological behavior, shear thinning, and jetting of ink drops. This effect is shown in the Examples and illustrated in FIG. 2, as will be described in greater detail hereinafter. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency. This effect is also shown in the Examples and illustrate in FIG. 3, as will be described in greater detail hereinafter.

The properties of the non-Newtonian inkjet ink, e.g., viscosity, optical density, ink efficiency, etc., can be affected by a number of variables including the type of metal oxide, the type of salt, the type of solvents, the amounts of these components, pH, ionic strength, etc. Regarding viscosity, as discussed herein, the viscosity for non-Newtonian fluids are not discrete but change based on the physical energy applied to the fluid. As used herein, "viscosity" refers to dynamic viscosity unless otherwise stated. For the present inks, the viscosity can generally be measured at two states: proximate in time to an at rest state; i.e., with a minimum shear applied to the ink (shear rate as low as 5 s$^{-1}$), and proximate in time to a processing state; i.e., with a significant shear applied to the ink (shear rate of 10,000 s$^{-1}$). In one example, the present inks can have a dynamic viscosity ranging from 25 cps to 2,000 cps at temperature of 25° C. and a shear rate of 5 s$^{-1}$ and a dynamic viscosity ranging from 1 cps to 20 cps at a shear rate of 10,000 s$^{-1}$. In another example, the present inks can have a dynamic viscosity of 25 cps to 1,000 cps at shear rate of 5 s$^{-1}$ and is 1 cps to 15 cps at a shear rate of shear rate of 10,000 s$^{-1}$. Additionally, in one example, the metal oxide and the salt can be present in a non-Newtonian inkjet ink at a metal oxide to salt ratio ranging from 0.5:1 to 5:1 by weight. In one aspect, the ratio can be from 2:1 to 3:1.

Generally, the present structured network is formed in a liquid phase containing an organic solvent. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, measured at any functional shear rate. As used herein, "network non-participating solvent" refers to organic solvents that decrease the viscosity of the non-Newtonian inkjet ink, measured at any functional shear rate. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxy-propanediol (EHPD), glycerol, 1,5 pentanediol, ethylene glycol, triethylene glycol, and mixtures thereof. In another example, network non-participating solvents can include 2-pyrrolidinone, 1,2 pentanediol, MPdiol, 1,2 hexanediol, and mixtures thereof. As such, the structured network properties, and resultant non-Newtonian inkjet ink properties can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In another aspect, the organic solvent can be present in an amount ranging from 20% to 40% by weight.

As discussed herein, the present inks can include a colorant. Such colorants can be pigments and/or dyes. In one example, the colorant is a pigment, and in one aspect, a dispersed pigment. Pigments can be any dispersed colorant generally used in the ink jet arts, including, but not limited to self-dispersed pigments that are dispersed by either small molecules or polymers, etc., or dispersing agent dispersed pigments that are dispersed by the addition of a separate dispersing agent, e.g. a polymeric dispersing agent. In other examples, the colorant can be a dye, including one or more of the many water soluble dyes that are typically used in the inkjet arts. Examples include direct dyes, vat dyes, sulphur dyes, organic dyes, reactive dyes, disperse dyes, acid dyes, azoic dyes, or basic dyes. In yet another example, the colorant can be a mixture of a pigment and a dye.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.01% by weight to 10% by weight. The present formulations can include other components, such as biocides, viscosity modifiers, materials for pH adjustment, sequestering agents, preservatives, and the like.

Metal oxide particles, e.g. $Fe_3O_4$, can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse metal oxide particles can be a polyether alkoxysilane or polyether phosphate dispersant.

Examples of polyether alkoxysilane dispersants used to dispersed metal oxide particles can be represented by the following general Formula (I):

(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse metal oxide particles can include polyether alkoxysilane dispersants having the following general Formula (II):

(II)

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the metal oxide particles present in the ink composition are dispersed with polyether alkoxysilanes. Examples of suitable polyether alkoxysilanes include $(CH_3O)_3Si—(CH_2CH_2O)_{n'}$, H; $(CH_3CH_2O)_3Si—(CH_2CH_2O)_{n'}$, H; $(CH_3O)_3Si—(CH_2CH_2O)_{n'}$, $CH_3$; $(CH_3CH_2O)_3Si—(CH_2CH_2O)_{n'}$, $CH_3$; $(CH_3O)_3Si—(CH_2CH_2O)_{n'}$, $CH_2CH_3$; $(CH_3CH_2O)_3Si—(CH_2CH_2O)_{n'}$, $CH_2CH_3$; $(CH_3O)_3Si—(CH_2CH(CH_3)O)_{n'}$, H; $(CH_3CH_2O)_3Si—(CH_2CH(CH_3)O)_{n'}$, H; $(CH_3O)_3Si—(CH_2CH(CH_3)O)_{n'}$, $CH_3$; $(CH_3CH_2O)_3Si—(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is between about 2 to about 150% by weight of the metal oxide particles content. In some other examples, the dispersant content range is between about 5 to about 100% by weight of the metal oxide particles content. The dispersion of metal oxide particles can be prepared via milling or dispersing metal oxide powder in water in the presence of suitable dispersants.

The metal oxide dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the metal oxide pigment. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

Figure 4:
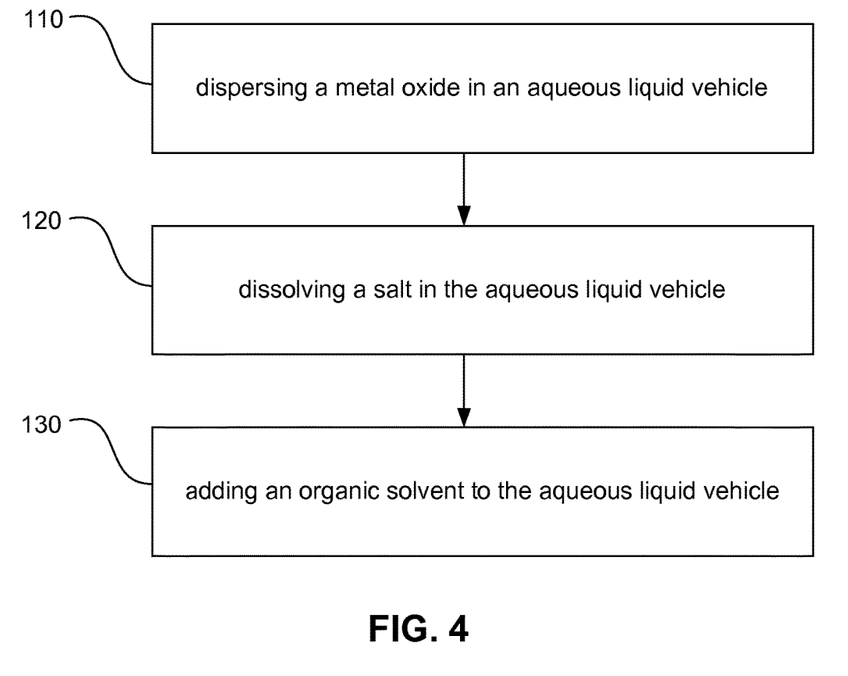
FIG. 4 is a flow chart of a method in accordance with an example of the present disclosure.

In addition to the non-Newtonian inkjet inks described herein, the present disclosure provides for methods relating thereto. The discussion above related to the non-Newtonian inkjet inks related to this method and other methods, as previously mentioned. Turning now to FIG. 4, a method of manufacturing a non-Newtonian inkjet ink can comprise dispersing 110 a metal oxide in an aqueous solution to form a metal oxide dispersion, mixing 120 a salt in to the metal oxide dispersion, and adding 130 an organic solvent to the metal oxide dispersion. Generally, the metal oxide, the salt and the organic solvent are present in amounts sufficient to form a structured network and provide a dynamic viscosity ranging from 25 cps to 10,000 cps at a shear rate of 5 s$^{-1}$ and a dynamic viscosity ranging from 1 cps to 50 cps at a shear rate of 10,000 s$^{-1}$. Regarding the dispersions, such metal oxides can be treated with a dispersing agent, milled in solvents, or combinations thereof. In one example, the metal oxide can be treated with an alkoxysilane and milled to provide a specific particle size.

The present method can further comprise mixing a colorant into the non-Newtonian inkjet inks. In one example, the colorant can be a pigment. As discussed herein, such pigments can be self-dispersed or can further include dispersants, e.g., a polymer dispersant. In one example, commercially available colloidal metal oxide dispersions of particle sizes from 10 to 50 nm, such as silica or alumina, can be used. Examples of such materials are available from companies such as Nissan Chemical American Corporation and US Research Nanomaterials, Inc., among others.

Figure 5:
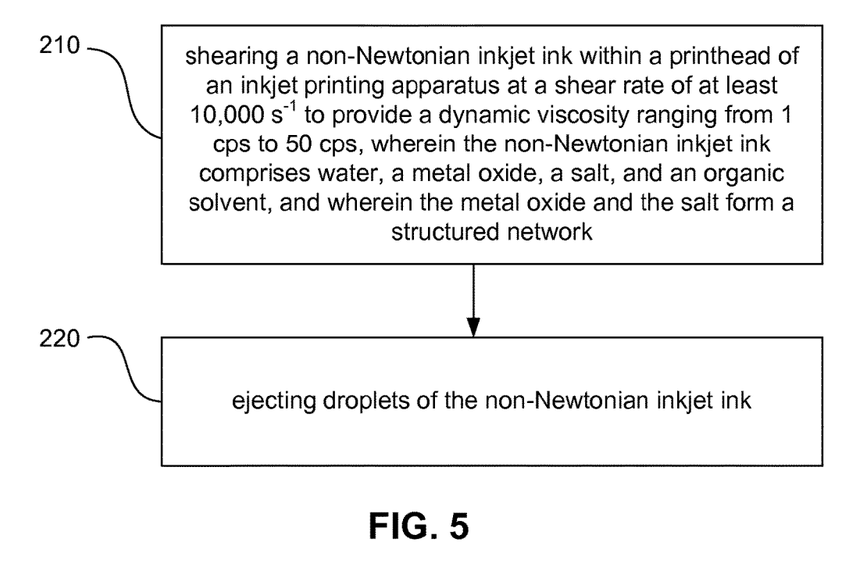
FIG. 5 is a flow chart of a method in accordance with an example of the present disclosure.

Turning now to FIG. 5, a method of printing a non-Newtonian inkjet ink can comprise shearing 210 (e.g., thermal and/or physical) a non-Newtonian inkjet ink within a printhead of an inkjet printing apparatus at a shear rate of at least 10,000 $s^{-1}$ to provide a dynamic viscosity ranging from 1 cps to 50 cps, and ejecting 220 droplets of the non-Newtonian inkjet ink. Generally, as discussed herein, the non-Newtonian inkjet ink can comprise a metal oxide, a salt, and an organic solvent, wherein the metal oxide form a structured network in the presence of the salt and the organic solvent.

Regarding method steps generally, such steps can be performed in a number of sequences and are not intended to be limited to require any particular sequence. For example, the adding of the organic solvent can be before mixing of the salt, and vice versa. Additionally, it is noted that any and all combinations of such steps or individual step may be performed sequentially or simultaneously. For example, mixing of the salt and the adding of the organic solvent may be performed sequentially or may be performed simultaneously.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is to be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following illustrates some examples of the present inks and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present inks and methods have been described above with particularity, the following examples provide further detail in connection with what are presently deemed to be the acceptable embodiments.

Example 1—Non-Newtonian Inkjet Inks

A non-Newtonian inkjet ink was prepared with the components and the amounts listed in Table 1.

TABLE 1

| Components | Ink 1 |
|---|---|
| Aluminum Oxide (20 nm)* | 3 wt % |
| Sodium Nitrate | 1.5 wt % |
| EHPD | 10 wt % |
| Dispersed carbon black** | 3.5 wt % |
| 2-pyrrolididone | 10 w % |
| pH | 10 |
| Viscosity*** at 133 $s^{-1}$ | 137 cps |
| Viscosity*** at 10000 $s^{-1}$ | 8 cps |
| Water | Balance |

*4.5 pH Dispersed aluminum oxide
**Dispersed Carbon Black: Cabot Series 300 K obtained from Cabot Corporation.
***Viscosities measured on a CAP2000 Rheometer from Brookfield Instruments at 25° C.

Example 2—Viscosity vs. Shear Rate

The viscosities of the non-Newtonian inkjet ink of Example 1 were measured on a CAP2000 rheometer from Brookfield Instruments for varying shearing rates at 25° C., as reported in Table 2.

TABLE 2

| Shear Rate ($s^{-1}$) | Viscosity (cps) |
|---|---|
| 133 | 137 |
| 667 | 40 |
| 1333 | 27 |
| 5333 | 12 |
| 10667 | 8 |

Example 3—Optical Density vs. Paper and Print Density

Various recording media were printed at varying print densities using the non-Newtonian inkjet ink of Example 1 and a comparative Newtonian inkjet ink, HP DJ970 black ink commercially available from the Hewlett-Packard Company (Ink 2), with the optical density values as reported in Tables 3A and 3B, respectively. The optical densities were measured using Gretag Macbeth® Spectrolino densitometer. Printing was performed at various percentages with 1200× 1200 dpi and various ink flux (ng/300 dpi).

TABLE 3A

| | Non-Newtonian Inkjet Ink (Ink 1) | | | | |
|---|---|---|---|---|---|
| Coverage (%) | Ink Flux (ng/300 dpi) | HPMP (OD) | HPRC (OD) | STAPLES (OD) | GPCP (OD) |
| 2 | 2.88 | 0.16 | 0.17 | 0.16 | 0.17 |
| 4 | 5.76 | 0.26 | 0.26 | 0.26 | 0.28 |
| 8 | 11.52 | 0.46 | 0.46 | 0.47 | 0.48 |
| 12 | 17.28 | 0.64 | 0.64 | 0.65 | 0.67 |
| 16 | 23.04 | 0.86 | 0.79 | 0.81 | 0.84 |
| 20 | 28.8 | 1.01 | 0.96 | 1 | 0.97 |
| 24 | 34.56 | 1.12 | 1.11 | 1.13 | 1.09 |
| 28 | 40.32 | 1.23 | 1.24 | 1.27 | 1.23 |
| 30 | 43.2 | 1.29 | 1.31 | 1.32 | 1.32 |
| 32 | 46.08 | 1.32 | 1.37 | 1.41 | 1.36 |
| 34 | 48.96 | 1.4 | 1.41 | 1.43 | 1.41 |
| 36 | 51.84 | 1.42 | 1.42 | 1.47 | 1.44 |
| 38 | 54.72 | 1.42 | 1.43 | 1.49 | 1.44 |
| 40 | 57.6 | 1.49 | 1.48 | 1.51 | 1.47 |
| 42 | 60.48 | 1.49 | 1.51 | 1.51 | 1.51 |
| 44 | 63.36 | 1.5 | 1.53 | 1.53 | 1.55 |
| 46 | 66.24 | 1.53 | 1.53 | 1.55 | 1.56 |

TABLE 3A-continued

Non-Newtonian Inkjet Ink (Ink 1)

| Coverage (%) | Ink Flux (ng/300 dpi) | HPMP (OD) | HPRC (OD) | STAPLES (OD) | GPCP (OD) |
|---|---|---|---|---|---|
| 48 | 69.12 | 1.54 | 1.54 | 1.56 | 1.55 |
| 50 | 72 | 1.57 | 1.56 | 1.58 | 1.54 |
| 52 | 74.88 | 1.56 | 1.56 | 1.59 | 1.59 |
| 54 | 77.76 | 1.55 | 1.58 | 1.59 | 1.59 |
| 56 | 80.64 | 1.56 | 1.6 | 1.59 | 1.61 |
| 58 | 83.52 | 1.59 | 1.58 | 1.59 | 1.61 |
| 60 | 86.4 | 1.59 | 1.6 | 1.61 | 1.65 |
| 62 | 89.28 | 1.61 | 1.59 | 1.61 | 1.61 |
| 64 | 92.16 | 1.63 | 1.58 | 1.6 | 1.62 |
| 66 | 95.04 | 1.58 | 1.59 | 1.62 | 1.6 |
| 68 | 97.92 | 1.6 | 1.61 | 1.59 | 1.59 |
| 70 | 100.8 | 1.6 | 1.61 | 1.6 | 1.62 |
| 72 | 103.68 | 1.59 | 1.61 | 1.61 | 1.61 |
| 74 | 106.56 | 1.58 | 1.59 | 1.64 | 1.64 |
| 76 | 109.44 | 1.6 | 1.6 | 1.61 | 1.62 |

HPMP—HP ® Multipurpose Paper -ColorLok ® (International Paper Company)
HPRC—HP ® Recycled ColorLok ® (International Paper Company)
STAPLES—Staples Copy Paper (Made for Staples)
GPCP—GEORGIA PACIFIC COPY PAPER (Georgia Pacific)
All are 20 lb papers

TABLE 3B

Comparative Ink (Ink 2)

| Coverage (%) | Ink Flux (ng/300 dpi) | HPMP (OD) | HPRC (OD) | STAPLES (OD) | GPCP (OD) |
|---|---|---|---|---|---|
| 2 | 2.88 | 0.18 | 0.17 | 0.18 | 0.17 |
| 4 | 5.76 | 0.3 | 0.26 | 0.29 | 0.28 |
| 8 | 11.52 | 0.49 | 0.44 | 0.49 | 0.48 |
| 12 | 17.28 | 0.67 | 0.6 | 0.66 | 0.66 |
| 16 | 23.04 | 0.81 | 0.78 | 0.81 | 0.83 |
| 20 | 28.8 | 0.91 | 0.89 | 0.91 | 0.97 |
| 24 | 34.56 | 1.02 | 1.02 | 0.99 | 1.09 |
| 28 | 40.32 | 1.06 | 1.09 | 1.1 | 1.16 |
| 30 | 43.2 | 1.07 | 1.17 | 1.14 | 1.25 |
| 32 | 46.06 | 1.11 | 1.22 | 1.17 | 1.29 |
| 34 | 48.96 | 1.12 | 1.27 | 1.21 | 1.34 |
| 36 | 51.84 | 1.16 | 1.29 | 1.21 | 1.38 |
| 38 | 54.73 | 1.18 | 1.33 | 1.26 | 1.36 |
| 40 | 57.6 | 1.19 | 1.36 | 1.25 | 1.4 |
| 42 | 60.48 | 1.19 | 1.34 | 1.31 | 1.42 |
| 44 | 63.36 | 1.24 | 1.39 | 1.32 | 1.45 |
| 46 | 66.24 | 1.19 | 1.38 | 1.28 | 1.44 |
| 48 | 69.12 | 1.22 | 1.39 | 1.34 | 1.45 |
| 50 | 72 | 1.24 | 1.42 | 1.35 | 1.48 |
| 52 | 74.88 | 1.27 | 1.43 | 1.34 | 1.48 |
| 54 | 77.76 | 1.23 | 1.42 | 1.37 | 1.47 |
| 56 | 80.64 | 1.3 | 1.44 | 1.4 | 1.48 |
| 58 | 83.52 | 1.31 | 1.45 | 1.41 | 1.5 |
| 60 | 86.4 | 1.27 | 1.45 | 1.42 | 1.5 |
| 62 | 89.28 | 1.3 | 1.45 | 1.39 | 1.47 |
| 64 | 92.16 | 1.3 | 1.46 | 1.42 | 1.48 |
| 66 | 95.04 | 1.27 | 1.46 | 1.4 | 1.49 |
| 68 | 97.92 | 1.34 | 1.45 | 1.44 | 1.48 |
| 70 | 100.08 | 1.34 | 1.47 | 1.44 | 1.48 |
| 72 | 103.68 | 1.33 | 1.46 | 1.45 | 1.48 |
| 74 | 106.5 | 1.36 | 1.49 | 1.45 | 1.47 |
| 76 | 109.4 | 1.35 | 1.45 | 1.45 | 1.5 |

HPMP—HP ® Multipurpose Paper -ColorLok ® (International Paper Company)
HPRC—HP ® Recycled ColorLok ® (International Paper Company)
STAPLES—Staples Copy Paper (Made for Staples)
GPCP—GEORGIA PACIFIC COPY PAPER (Georgia Pacific)
All are 20 lb papers As can be seen from Tables 3A and 3B, the non-Newtonian inkjet ink is more ink efficient than the comparative ink. Ink efficiency can be measured as OD provided by mass of ink. This data is represented graphically in FIG. 1. As shown above, the present OD per ink flux was generally found to be superior for the present non-Newtonian inkjet ink. Such optical density performance was independent of paper type; i.e. the OD improvement can be seen on treated (Color-Lok®) and untreated paper (Staples Copy Paper).

Example 4—Impact of Salt on Inkjet Ink

Four formulations were prepared, two with added salt, and two with only background concentrations of salt inherently introduced by the additives (i.e. less 0.1 wt %, or even less than 0.05 wt % in some situations). Thus, Inks 3 and 5 included added salt, and Inks 4 and 6 did not include any affirmatively added salt (only background salt). Inks 5 and 6 did not include colorant, but colorant can be added. These inks are set forth in Table 4, as follows:

TABLE 4

| Components | Ink 3 | Ink 4 | Ink 5 | Ink 6 |
|---|---|---|---|---|
| Aluminum Oxide 1 (20 nm)* | 3.5 | 3.5 | — | — |
| Aluminum Oxide 2 (20 nm)** | — | — | 5 | 5 |
| EHPD | 10 | 10 | — | — |
| 1,2-Pentanediol | — | — | 12 | 12 |
| 2-Pyrrolidinone | 10 | 10 | 8 | 8 |
| Dispersed Carbon Black*** | 3.5 | 3.5 | — | — |
| Sodium Nitrate | 1.5 | — | — | — |
| Calcium Nitrate | — | — | 5 | — |
| Water | Balance | Balance | Balance | Balance |
| PH | 10 | 10 | 6 | 6 |

*4.5 pH Dispersed aluminum oxide (25% pigment of SCA Silquest A1230) as obtained from Momentive Corporation
**Dispersed aluminum oxide (50% pigment of SCA SilQuest A1230) as obtained from Momentive Corporation
***Dispersed Carbon Black: Cabot Series 400 K obtained from Cabot Corporation.

As a note, the background salt can come in from any of a number of additives, but in the present example, the two primary sources were the metal oxide dispersion and from pH adjustment. Lesser amounts might come from the colorant dispersion. These sources, in most cases, can typically be confirmed to be low, as determined by measuring conductivity. As a specific example, without affirmatively added salt, ink conductivity tends to be less than about 1000 μS/cm, less than about 750 μS/cm, or even less than about 500 μS/cm. With added salt, the conductivity can be greater than 1000 μS/cm, e.g., about 5.76 mS/cm for 1.0 wt % of added $NaNO_3$, or 10.9 mS/cm for 1.5 wt % added $NaNO_3$. With this as a guide, typically, the background salt is less than about 0.1% by weight or about 1000 ppm by weight, including both cation and anion species. The actual nominal values may also be less, e.g., less than about 0.05 wt % or 500 ppm. By increasing the salt content above about 0.05 wt % or above 0.1 wt %, improvements in ink performance can start to be seen. For example, with greater salt concentrations, improved ejection and/or print media performance can be achieved, e.g., 0.5 wt %, 1 wt % 1.5 wt %, 2.5 wt %, 5 wt % salt, 7.5 wt %, 10 wt % salt, etc.

Example 5—Viscosity vs. Shear Rate (Salted Ink vs. Low Background Salt Ink)

Inks 3 and Ink 4 were tested for viscosity vs. shear rate, and the data is provided in Table 5, as follows:

TABLE 5

| Shear Rate ($s^{-1}$) | Ink 3 Viscosity (cps) | Ink 4 Viscosity (cps) |
|---|---|---|
| 1333 | 21.94 | 30.61 |
| 5333 | 9.24 | 11.47 |
| 10667 | 6.54 | 7.43 |

As can be seen from this data, the salted inkjet ink (Ink 3) had a lower viscosity at various shear rates in the presence of the added salt, which in this specific example, was just enough to make a large difference in the printing characteristics of the ink. The rate at which the ink can refill and produce a higher quality print is greater for the ink with added salt. On the other hand, the Ink with only very small concentrations of background salt (Ink 4) had less desirable printing characteristics with respect to viscosity for thermal inkjet printing.

Example 6—Optical Density (Salted Ink vs. Low Background Salt Ink)

Figure 2:
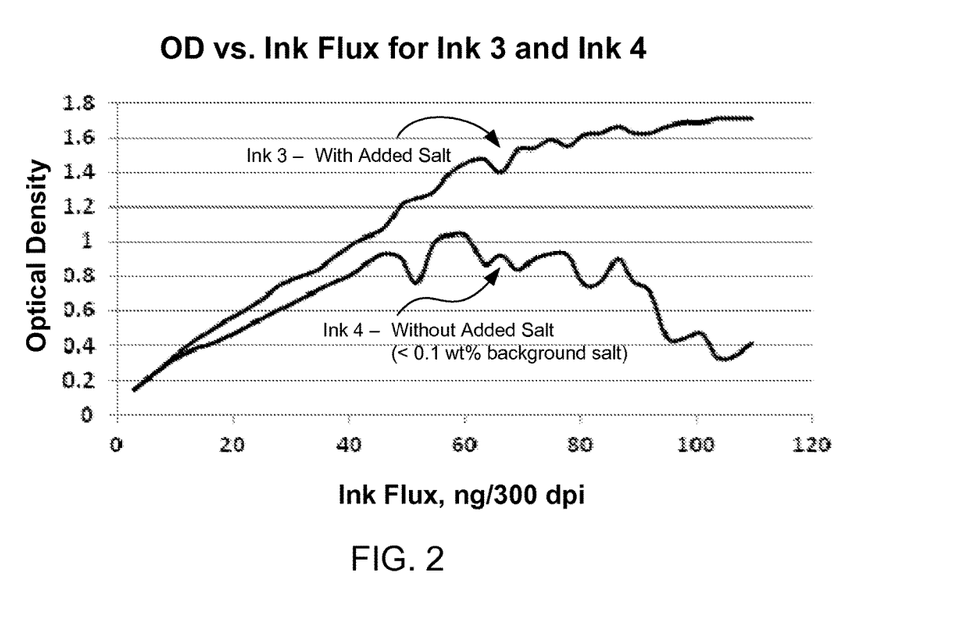
FIG. 2 is a graph of optical density for a non-Newtonian inkjet ink containing added salt vs. an ink that contain only minimal levels of background salt.
Figure 3:
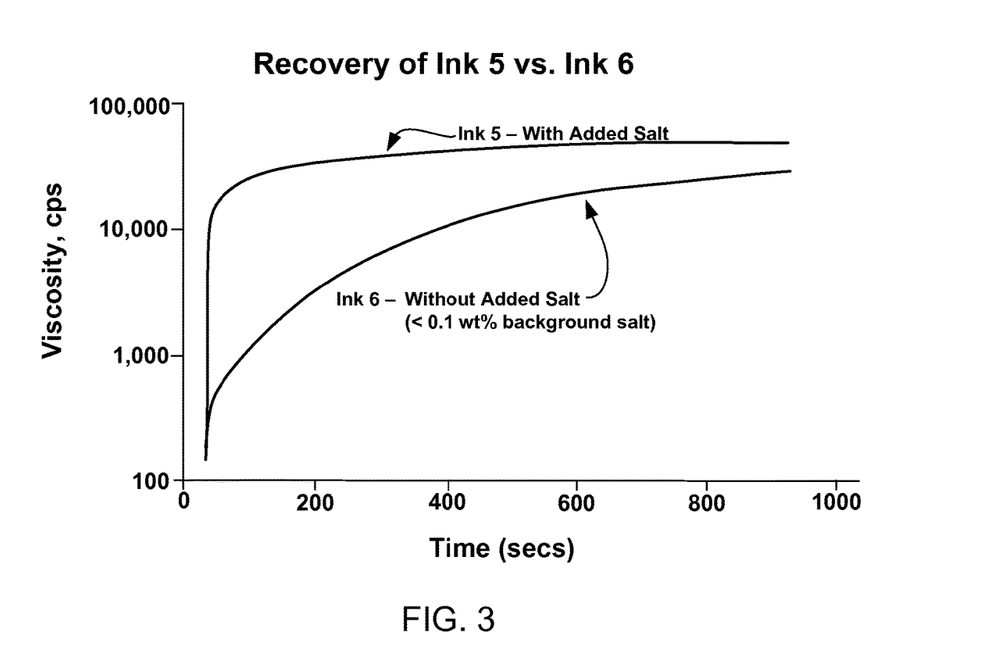
FIG. 3 is a graph that depicts recovery time for a non-Newtonian inkjet ink with added salt vs. an ink that contains only minimal levels of background salt.

Inks 3 and 4 were also both tested for black optical density at various ink fluxes, and the data is shown in FIG. 2 and Table 6, as follows:

TABLE 6

| Ink Flux (ng/300 dpi) | Ink 3 (OD) | Ink 4 (OD) |
| --- | --- | --- |
| 2.9 | 0.15 | 0.14 |
| 5.8 | 0.22 | 0.22 |
| 11.5 | 0.38 | 0.35 |
| 17.2 | 0.51 | 0.42 |
| 23 | 0.62 | 0.52 |
| 28.8 | 0.76 | 0.62 |
| 34.6 | 0.84 | 0.72 |
| 40.3 | 0.98 | 0.81 |
| 43.2 | 1.03 | 0.88 |
| 46.1 | 1.08 | 0.93 |
| 49 | 1.21 | 0.9 |
| 51.8 | 1.25 | 0.76 |
| 54.7 | 1.29 | 0.99 |
| 57.6 | 1.4 | 1.04 |
| 60.5 | 1.46 | 1.03 |
| 63.4 | 1.48 | 0.87 |
| 66.2 | 1.4 | 0.92 |
| 69.1 | 1.53 | 0.84 |
| 72 | 1.54 | 0.9 |
| 74.9 | 1.59 | 0.93 |
| 77.8 | 1.55 | 0.92 |
| 80.6 | 1.62 | 0.75 |
| 83.5 | 1.63 | 0.77 |
| 86.4 | 1.67 | 0.9 |
| 89.2 | 1.63 | 0.77 |
| 92.1 | 1.63 | 0.7 |
| 95 | 1.67 | 0.44 |
| 97.9 | 1.69 | 0.44 |
| 100.8 | 1.69 | 0.47 |
| 103.7 | 1.71 | 0.33 |
| 106.6 | 1.71 | 0.34 |
| 109.4 | 1.71 | 0.41 |

As can be seen in Table 6 and FIG. 2, Ink 4 (with only background salt levels) showed optical density vs. ink flux that is lower than that of Ink 3 (with added salt). More specifically, the falloff for Ink 4 at around 50 ng/300 dpi corresponds to the increasingly higher frequency of the printing as the ink flux is increased. The refill rate for Ink 4 is slower versus Ink 3, and thus reflects in significantly more stripping, missing nozzles, and poor overall print characteristics. This phenomena can be observed over a number formulations and pigment dispersions when no added salt (i.e. only background salt of less than 0.05 wt %) is present. The added salt to bring the concentration above at least about 0.05 wt % in some instances, and more typically above 0.1 wt %, can thus directly impact the ink structure, rheological behavior, shear thinning, and jetting of the ink drops.

Example 7—Recovery of Non-Newtonian Fluids after High Shear (Salted Ink Vs. Low Background Salt Ink)

Another area where the presence of added salt (above 0.05 wt % or above 0.1 wt %) has an impact relates to printed media attributes. Inks 5 and Ink 6 were tested for Fluid Recover, and the data is shown Schematically in FIG. 3. As the inkjet ink drop is ejected and leaves the printhead under very high shear conditions (in excess of 250,000 $s^{-1}$ at 25° C.), the ink network will revert to its pre-shear condition or gel state. The increased presence of salt in the system can enable a faster response or recovery than in inks without the increased salt content. It is noted that the viscosity axis in this FIG. is logarithmic. The viscosity curves in FIG. 3 were generated using an Anton-Paar viscometer, and the response after pre-shear was at 100 $s^{-1}$ for 30 seconds at 25° C. it is noted that In 5 reached a viscosity of ~10,000 cps in about 10 sec while Ink 6 took around 400 sec to reach a similar viscosity. Furthermore, Ink 6 will take increasingly longer times to reach higher viscosities than Ink 5 generally. A fast restructuring of the fluid means more solid-like behavior on the media surface in less time with less fluid penetration, and thus better colorant holdout and greater ink efficiency.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A non-Newtonian inkjet ink, comprising:
   a metal oxide in an amount ranging from 0.1% to 10% by weight based on the total weight of the non-Newtonian inkjet ink;
   a salt in an amount of 0.05% to 10% by weight based on the total weight of the non-Newtonian inkjet ink; and
   an organic solvent;
   wherein the metal oxide forms a structured network in the presence of the salt, wherein the structured network is free of polymer, and wherein the inkjet ink has a dynamic viscosity ranging from 25 cps to 10,000 cps at shear rate of 5 $s^{-1}$ and a dynamic viscosity ranging from 1 cps to 50 cps at a shear rate of 10,000 $s^{-1}$, measured at 25° C.

2. The non-Newtonian inkjet ink of claim 1, wherein the metal oxide is selected from the group consisting of aluminum oxide, silicon dioxide, zinc oxide, iron oxide, titanium dioxide, indium oxide, zirconium oxide, and mixtures thereof; and the salt includes a cation selected from the group consisting of sodium, lithium, potassium, magnesium, and calcium; and an anion selected from the group consisting of nitrate, chloride, sulfate, and acetate.

3. The non-Newtonian inkjet ink of claim 1, wherein the organic solvent is a network participating solvent selected from the group consisting of ethylhydroxy-propanediol, glycerol, 1,5 pentanediol, ethylene glycol, triethylene glycol, and mixtures thereof; or the organic solvent is a network non-participating solvent selected from the group consisting of 2-pyrrolidinone, 1,2 pentanediol, 2-methyl-1,3-propanediol, 1,2 hexanediol, and mixtures thereof.

4. The non-Newtonian inkjet ink of claim 1, wherein the organic solvent comprises only network participating solvent, or a mixture of network participating solvent and network non-participating solvent.

5. The non-Newtonian inkjet ink of claim 1, wherein the metal oxide is present in an amount ranging from 1% to 5% by weight based on the total weight of the non-Newtonian inkjet ink, and the salt is present in an amount ranging from 0.5% to 4% by weight based on the total weight of the non-Newtonian inkjet ink.

6. The non-Newtonian inkjet ink of claim 1, wherein the non-Newtonian inkjet ink is an aqueous inkjet ink, and the organic solvent is present in an amount ranging from 5% to 50% by weight based on the total weight of the non-Newtonian inkjet ink.

7. The non-Newtonian inkjet ink of claim 1, wherein the metal oxide and the salt are present at a metal oxide to salt ratio ranging from 0.5:1 to 5:1 by weight and the metal oxide has a an average particle size ranging from 5 to 50 nm.

8. The non-Newtonian inkjet ink of claim 1, further comprising a colorant.

9. The non-Newtonian inkjet ink of claim 1, wherein the dynamic viscosity is 25 cps to 2,000 cps at shear rate of 5 $s^{-1}$ and is 1 cps to 15 cps at a shear rate of shear rate of 10,000 $s^{-1}$, measured at 25° C.

10. A method of manufacturing the non-Newtonian inkjet ink of claim 1, comprising:
dispersing the metal oxide in an aqueous liquid vehicle;
dissolving the salt in the aqueous liquid vehicle; and
adding the organic solvent to the aqueous liquid vehicle.

11. The method of claim 10, wherein the metal oxide is present in an amount ranging from 1% to 5% by weight based on the total weight of the non-Newtonian inkjet ink; the salt is present in an amount of 0.5% to 4% by weight based on the total weight of the non-Newtonian inkjet ink; and the organic solvent is present in an amount ranging from 20% to 40% by weight based on the total weight of the non-Newtonian inkjet ink.

12. The method of claim 10, further comprising mixing a colorant into the non-Newtonian inkjet ink.

13. The method of claim 10, wherein the structured network is free of polymers.

14. A method of printing the non-Newtonian inkjet ink of claim 1, comprising:
shearing the non-Newtonian inkjet ink within a printhead of an inkjet printing apparatus at a shear rate of 10,000 $s^{-1}$ or more to provide the dynamic viscosity ranging from 1 cps to 50 cps; and
ejecting droplets of the non-Newtonian inkjet ink.

15. The method of claim 14, wherein the metal oxide is present in an amount ranging from 1% to 5% by weight based on the total weight of the non-Newtonian inkjet ink; the salt is present in an amount of 0.5% to 4% by weight based on the total weight of the non-Newtonian inkjet ink; and the organic solvent is present in an amount ranging from 20% to 40% by weight based on the total weight of the non-Newtonian inkjet ink.

16. The method of claim 14, further comprising a colorant.

17. The method of claim 14, wherein the structured network is free of polymers.

18. The method of claim 14, wherein shearing the non-Newtonian inkjet ink provides a dynamic viscosity ranging from 1 cps to 15 cps.

19. The method of claim 10, wherein the metal oxide is selected from the group consisting of aluminum oxide, silicon dioxide, zinc oxide, iron oxide, titanium dioxide, indium oxide, zirconium oxide, and mixtures thereof; and the salt includes a cation selected from the group consisting of sodium, lithium, potassium, magnesium, and calcium; and an anion selected from the group consisting of nitrate, chloride, sulfate, and acetate.

20. The method of claim 10, wherein the organic solvent comprises only network participating solvent, or a mixture of network participating solvent and network non-participating solvent, and wherein the network participating solvent is selected from the group consisting of ethylhydroxypropanediol, glycerol, 1,5 pentanediol, ethylene glycol, triethylene glycol, and mixtures thereof; or the organic solvent is a network non-participating solvent selected from the group consisting of 2-pyrrolidinone, 1,2 pentanediol, 2-methyl-1,3-propanediol, 1,2 hexanediol, and mixtures thereof.

* * * * *

UNITED STATES PATENT AND TRADEMARK OFFICE
CERTIFICATE OF CORRECTION

PATENT NO. : 10,400,122 B2
APPLICATION NO. : 15/119087
DATED : September 3, 2019
INVENTOR(S) : Raymond Adamic et al.

Page 1 of 1

It is certified that error appears in the above-identified patent and that said Letters Patent is hereby corrected as shown below:

In the Claims

In Column 15, Line 14 (approx.), Claim 7, after "has" delete "a".

In Column 15, Line 19, Claim 9, after "shear rate of" delete "shear rate of".

Signed and Sealed this
Thirty-first Day of December, 2019

Andrei Iancu
*Director of the United States Patent and Trademark Office*